(12) United States Patent
Krize et al.

(10) Patent No.: US 10,381,774 B2
(45) Date of Patent: Aug. 13, 2019

(54) EASILY INSTALLED VERSATILE ELECTRICAL ACCESS SYSTEM USING MAGNETIC ELECTRICAL CONNECTORS

(71) Applicant: Christmas Northeast, Inc., Trumbull, CT (US)

(72) Inventors: Anthony Krize, Redwood City, CA (US); Matthew Ryder, Attleboro, MA (US); James W. Gibboney, Jr., Suches, GA (US)

(73) Assignee: Christmas Northeast, Inc., Trumbull, CT (US)

( * ) Notice: Subject to any disclaimer, the term of this patent is extended or adjusted under 35 U.S.C. 154(b) by 0 days.

(21) Appl. No.: 16/205,961

(22) Filed: Nov. 30, 2018

(65) Prior Publication Data

US 2019/0109412 A1    Apr. 11, 2019

Related U.S. Application Data

(63) Continuation-in-part of application No. 15/899,722, filed on Feb. 20, 2018, now abandoned, which is a
(Continued)

(51) Int. Cl.
*H01R 25/14* (2006.01)
*H01R 13/62* (2006.01)
(Continued)

(52) U.S. Cl.
CPC ......... *H01R 13/6205* (2013.01); *H01R 13/73* (2013.01); *H01R 25/006* (2013.01);
(Continued)

(58) Field of Classification Search
CPC .... H01R 25/14; H01R 25/142; H01R 9/2608; H01R 9/2691; H01R 25/145; H01R 31/06
(Continued)

(56) References Cited

U.S. PATENT DOCUMENTS 2,261,986 A    11/1941    Frank
2,332,766 A    10/1943    Von Gehr
(Continued)

*Primary Examiner* — Abdullah A Riyami
*Assistant Examiner* — Justin M Kratt
(74) *Attorney, Agent, or Firm* — Nexsen Pruet, LLC; Michael A. Mann

(57) ABSTRACT

A support is configured to be attached to and supported by a surface and to a channel running from the first end to the opposing second end of the support. The support carries a first magnetic electrical connector in a first end of the channel and a second magnetic electrical connector, wired to the first, in the opposing, second end of the channel. The first magnetic electrical connector is in electrical connection with the second magnetic electrical connector via at least one electrical conductor. An electrical current applied to the first magnetic electrical connector is conveyed by that electrical conductor to the second magnetic electrical connector. Wiring is directed through holed in the support to access points in the outer surface of the support where the user may access electrical current for operating appliances, charging batteries, and passing digital information. The supports may be decorative molding such as baseboards, crown molding, and chair rails.

12 Claims, 17 Drawing Sheets

Related U.S. Application Data continuation-in-part of application No. 15/437,106, filed on Feb. 20, 2017, now Pat. No. 9,899,813, which is a continuation-in-part of application No. 15/063,948, filed on Mar. 8, 2016, now Pat. No. 9,614,322, application No. 16/205,961, which is a continuation-in-part of application No. 16/108,642, filed on Aug. 22, 2018, now Pat. No. 10,236,627.

(60) Provisional application No. 62/679,088, filed on Jun. 1, 2018.

(51) Int. Cl.
  *H01R 13/73* (2006.01)
  *H01R 25/00* (2006.01)
  *H02G 3/04* (2006.01)
  *H02G 3/12* (2006.01)
  *H02G 3/38* (2006.01)
  *H01R 9/26* (2006.01)
  *H01R 31/06* (2006.01)
  *H02G 9/02* (2006.01)

(52) U.S. Cl.
  CPC ........... *H02G 3/0425* (2013.01); *H02G 3/128* (2013.01); *H02G 3/388* (2013.01); *H01R 9/2608* (2013.01); *H01R 9/2691* (2013.01); *H01R 25/14* (2013.01); *H01R 25/142* (2013.01); *H01R 25/145* (2013.01); *H01R 31/06* (2013.01); *H02G 9/025* (2013.01)

(58) Field of Classification Search
  USPC ......... 439/110, 112, 115, 119, 120, 121, 716
  See application file for complete search history.

(56) References Cited

U.S. PATENT DOCUMENTS

| | | | |
|---|---|---|---|
| 2,441,461 A | | 5/1948 | Anthony |
| 2,579,854 A | | 12/1951 | Perkins |
| 2,617,848 A | * | 11/1952 | Malone .................. H01R 25/14 |
| | | | 174/97 |
| 2,666,907 A | | 1/1954 | Hensley, Jr. |
| 4,245,874 A | | 1/1981 | Bishop |
| 4,278,834 A | | 7/1981 | Boundy |
| 5,367,122 A | | 11/1994 | De Olano |
| 6,180,878 B1 | | 1/2001 | Gretz |
| 7,311,526 B2 | * | 12/2007 | Rohrbach .......... H01R 13/6205 |
| | | | 439/39 |
| 8,794,980 B2 | | 8/2014 | McCormack |
| 8,936,472 B1 | | 1/2015 | Gibboney, Jr. |
| 9,300,083 B2 | * | 3/2016 | Bosscher ............. H01R 13/665 |
| 9,614,322 B1 | | 4/2017 | Gibboney, Jr. |
| 9,899,813 B1 | | 2/2018 | Gibboney, Jr. |
| 10,014,624 B2 | | 7/2018 | Chun |
| 2008/0081500 A1 | | 4/2008 | Chen |
| 2013/0225012 A1 | | 8/2013 | Leng |
| 2014/0016503 A1 | | 1/2014 | Altekar |

\* cited by examiner

EASILY INSTALLED VERSATILE ELECTRICAL ACCESS SYSTEM USING MAGNETIC ELECTRICAL CONNECTORS

TECHNOLOGY FIELD

This disclosure is related generally to the distribution of and access to electricity for users, and, more particularly, for easily-installed electrical access systems for use in connecting appliances, battery charging cables, and for accessing cable and wireless information transmission and reception networks.

BACKGROUND

The demand for electricity for charging batteries, for electrical power to operate appliances, and for wireless signal transmission is increasing. This demand arises in businesses, in residences, in vehicles, and out-of-doors. For example, on commercial aircraft, passengers require power for operating and recharging personal computers and mobile devices, for wireless communication with their business offices and for connecting to personal contacts on the ground.

The rapid expansion of the demand for these capabilities has altered the construction of newer homes, offices and vehicles, and has improved the capabilities of some pre-existing structures and vehicles. As technological advances meet the growing demand of today, demand continues to evolve.

In U.S. patent application Ser. No. 15/437,106, Magnetic Repulsion-Based Magnetic electrical connector, which is incorporated herein in its entirety by reference, teaches a structural electrical power distribution system that uses conduits holding magnetic repulsion electrical connectors to deliver electrical power on an ad hoc basis. This system could be used to provide alternating current or direct current, integrated safety systems, and digital signals useful for control functions and data transfer, including use in video surveillance, door or gateway monitoring, remote lock control and intercom operation. This system may alternatively be incorporated into temporary structures, such as construction barriers; and the conduits carrying the magnetic electrical connectors may be hidden behind decorative molding attached to a wall in order to conceal the existence of electrical power conductors. This system can also include transceiver connections and may replace extension cords that might otherwise be lying on the floor or ground at work sites, festivals, concerts, flea markets, and parties, where live electrical wires pose a tripping hazard and fire hazard.

A way to deliver electricity for power and communication purposes that is more integrated with existing structures in the environment of use and flexible in its capabilities would be an advantage.

SUMMARY

According to its major aspects and briefly recited, the present system includes a support configured to be attached to a support surface. The support has an outer surface, a first end, and an opposing second end. It has a channel running from its first end to its second end. The support carries a first magnetic electrical connector in the first end of the channel and a second magnetic electrical connector in the opposing, second end of the channel. The first magnetic electrical connector is in electrical connection with the second magnetic electrical connector via at least one electrical conductor running in the channel between the first magnetic electrical connector and the second magnetic electrical connector. An electrical current applied to the first magnetic electrical connector is conveyed by that electrical conductor, which electrical conductor is made of a resilient material, to the second magnetic electrical connector. Additionally, the electrical current may be tapped between the first and second magnetic electrical connectors in order to deliver electrical current for power or for signals between the magnetic electrical connectors. Moreover, plural supports may be interconnected end to end, much like extension cords, supported by supporting surfaces to create a protected path for electrical current delivery. The support may be decorative or have a secondary function, such as a chair rail in a home or office. Alternatively, a support may also serve as the supporting surface itself such as the railing of a deck.

An aspect of the disclosure is that the support and supporting surface may have complementary shapes, that is, the outer surface of the support may have one or more sides to which the support may be attached. For example, the support surface may have a channel into which the support may be inserted. The channel in the support may be inside the support or a groove formed in an outer surface of the support. The support and the supporting surface may thus combine and blend together. The remainder of the shape of the support surface, and the support itself may be decorative.

Another aspect of the disclosure is that the support may have a profile on one end that is configured to be joined end to end with an end of a second support.

An aspect of the disclosure is that the system further comprises a conduit that fits inside of the channel.

An aspect of the disclosure is the conduit includes a hole running from a point between the ends of the channel through the wall of the conduit and to the outer surface of the support so that the hole terminates at the outer surface of the support at a load that permits electrical connection with at least one of the electrical conductors in the channel. The term load is used herein to mean a device that is connected directly between the magnetic electrical connectors or to the electrical conductors inside the conduit and uses the electrical current carried by the magnetic electrical connectors and electrical conductors directly or indirectly. A load may be, for example, a universal serial bus port, a wireless router, an electrical socket, a light-emitting diode or diode array, an inductance coil, a camera, or other electrical device.

Another aspect of the disclosure is that the support may be selected from a variety of supports, including trim molding, crown molding, a chair rail, a baseboard, corner molding, trim on modular office partitions, and tent poles.

BRIEF DESCRIPTION OF THE DRAWINGS

In the figures,

FIG. 1 is a perspective view of a work surface having a support in the form of an insert into the work surface edge that carries the present electrical access system and which FIG. 1 shows a mobile device being plugged into a universal serial bus port carried by the insert for recharging the device, according to an aspect of the disclosure;

DETAILED DESCRIPTION

The present system disclosed is an easily-installed magnetic electrical access system. Specifically, the system enables an electrical source to be connected to an electrical sink, such as an appliance, using magnetic attraction and magnetic repulsion to connect or not connect, respectively, electrical conductors. The present system is useful as a source of electrical current, unobtrusively embedded in a support, and also readily accessible for operating various electrical lighting, appliances, charging batteries, and transmitting data. By providing an electrical access system that is carried in, for example, decorative molding, the present system may conveniently replace existing decorative molding or molding that might otherwise be added during interior renovation. The present electrical access system may be incorporated in trim pieces used in modular homes or in office furniture. The present system requires little in the way of accommodation or cost, and provides much to increase convenience in renovating existing space to meet the expanding need for access to electrical current.

The term "support" is used herein to refer to a physical object that may be partly decorative and is otherwise functional, inasmuch as its structural value in supporting electrical conduits and magnetic electrical connectors is at least a secondary function. The function as described herein is to convey electrical current for power or for data transmission from one place to another, thereby providing access to electrical current for a variety of uses to those near the support. Its secondary function may be to provide "functional ornamentation" by serving as trim work while hiding the magnetic electrical connectors and conductors it carries and perhaps also by hiding joints and seams or protecting walls against damage from furniture. The present system may carry decoration depending on the particular application and perform its primary function of delivering electrical power.

The term "magnetic electrical connectors" refers to electrical connectors that connect conductors carrying direct current together and use magnetic attraction and repulsion to orient themselves in order to preserve polarity.

Figure 1:
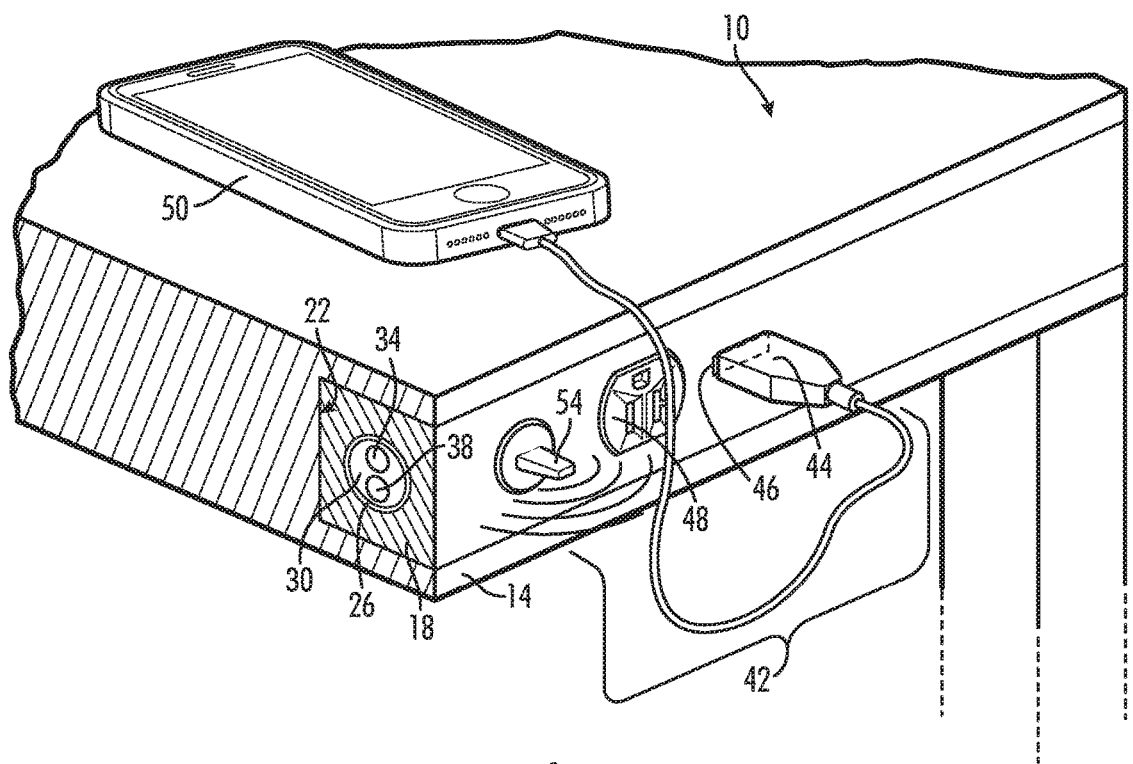

FIG. 1 illustrates an example of the present system. Shown in FIG. 1 is a partially cut away section of a work surface 10, such as a table, desk or countertop. A support 18 according to the present disclosure may have a complementary profile. A complementary profile is the shape of a cross-sectional view along at least a portion of a lineal structural member that allows it to be fitted against, into or onto other structures that have complementary shapes. For example, the edge 14 of work surface 10 may have a recess or channel 22 formed therein as shown, namely a wide groove with a square or rectangular cross section. Support 18 may have a shape that is a complementary profile, in that it may be inserted neatly into or onto channel 22 so that support 18 and edge 14 of work surface 10 are well-made and have a clean, finished appearance, while also having the additional and functional, purpose of delivering electrical current. The term complementary profile is used here to mean that the shape of support 18 is "keyed" to that of edge 14, wherein more mass on support 18 is offset by less mass on edge 14 and vice versa. The shape of support 18 complements in a geometric way the shape of the underlying surface of support 18, here, namely work surface 10, so that the two surfaces contact.

Support 18 contains a conduit 26 with magnetic electrical connectors wired together to deliver electrical current and data pulses using plural electrical conductors running from one end to the other, as will be explained presently. A magnetic electrical connector 30 with two contacts 34, 38, as seen in FIG. 1, may be connected to a subsequent magnetic electrical connector (not shown in FIG. 1), and which is similar to magnetic electrical connector 30 and its pair of electrical contacts. Through magnetism, namely, its magnetic electrical connectors, conduit 26 delivers electrical current from conduits (not shown) preceding it and transmitting electricity to those subsequent conduits to which conduit 26 is connected.

Between magnetic electrical connectors 30 of conduit 26 are wire pairs from magnetic electrical connector 30 that may run to an access point 42 through a hole in the wall of conduit 26 and on to the outer surface 28 of support 18. Access point 42 permits a user to connect devices or external wires to those wire pairs for electrical power and to send and receive data pulses via conduits 26. For example, access point 42 may be a universal serial bus port 46 accessed by a user using a universal serial port plug, as shown in FIG. 1, for charging a mobile device 50 or sending and receiving data, or a standard (Edison) electrical socket for connecting a laptop or personal computer to a source of alternating current using. A router antenna 54 is another example of an access point 42 for transmitting and receiving data wirelessly to and from a nearby wireless device, such as mobile device 50.

Figure 2:
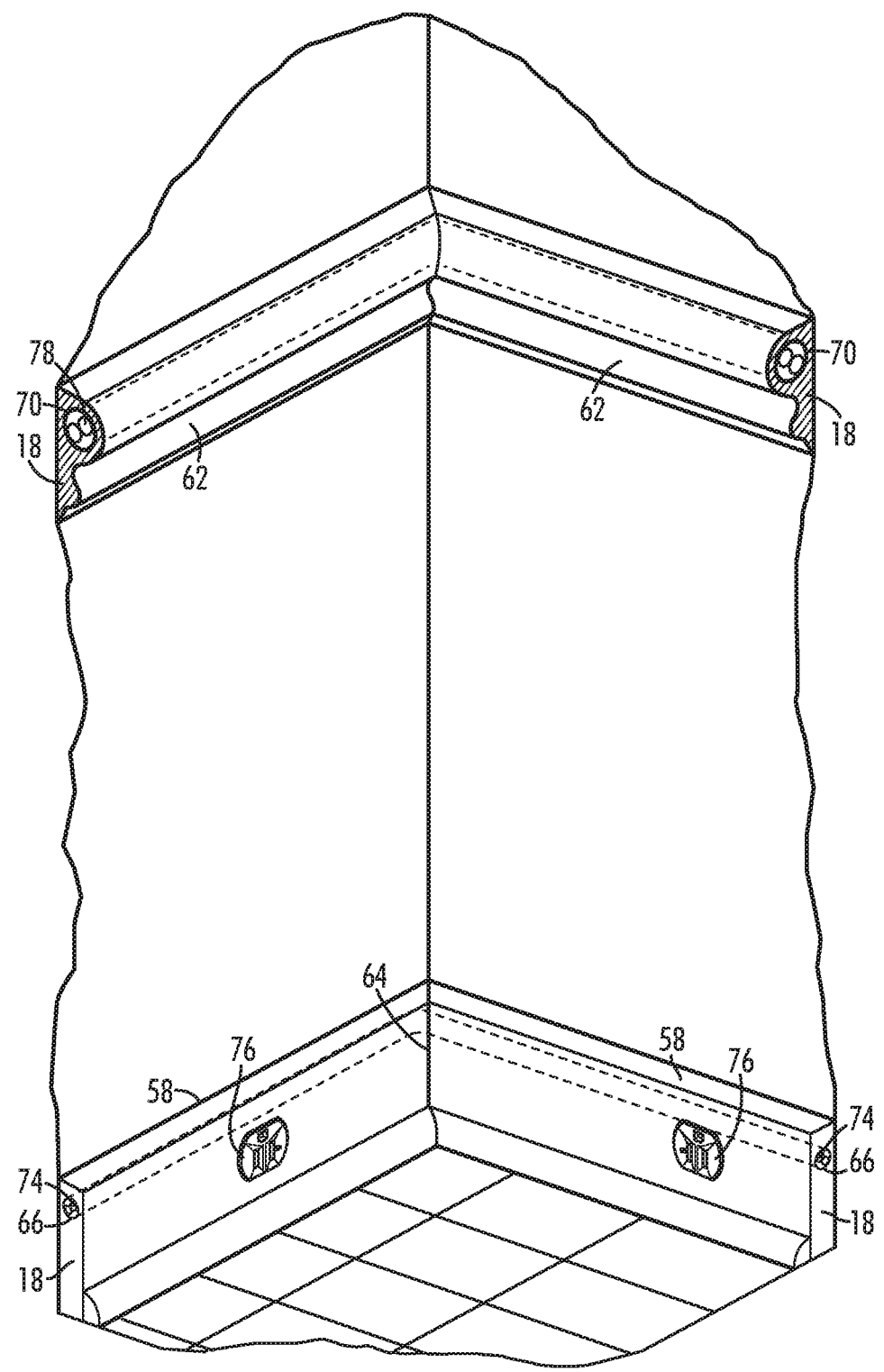
FIG. 2 is a perspective view of the corner of a room of a residence or office with baseboards and chair rails on its walls, the baseboards and chair rails carrying the present electrical access system according to an aspect of the disclosure.

FIG. 2 shows a different aspect of the present disclosure, one in which support 18 of FIG. 1 is provided for conduits 66, 70, with magnetic electrical connectors 74, 78, and Edison receptacles 76 in decorative molding that primarily serves to hide joints and protect walls from damage, but which may carry ornamentation. Support 18 may be, for example, trim molding, crown molding, chair rails, baseboards, and corner molding.

Baseboard 58 and chair rail 62 may be pre-formed, that is, routed or drilled channels similar to channels 22, into which conduits 66, 70 are inserted. Holes are formed, for example, by drilling from the exterior of baseboard 58 or chair rail 62 into conduits 66, 70 to enable the installer to pull wires from among those inside conduits 66, 70 to connect to an access point of the type desired. An access point may be, for example, a receptacle 76 that is attached electrically to the wiring pulled from within conduit 66 in order to secure the receptacle 76 to baseboard 58 or to chair rail 62. FIG. 2 shows joints 64 and 68 in baseboards 58 and in chair rails 62, respectively, where two sections of baseboards 58 and two sections of chair rails 62 are joined to continue the baseboard 58 and chair rail 62, respectively.

Baseboard 58 and chair rail 62 may be pre-formed, that is, routed or drilled to form channels similar to channels 22 of FIG. 1, into which conduits 66, 70 are inserted. Holes are formed, for example, by drilling from the exterior of baseboard 58 or chair rail 62 into conduits 66, 70 to enable the installer to pull wires from among those inside conduits 66, 70 to connect to an access point of the type desired. An access point may be, for example, a receptacle 76 that is attached electrically to the wiring pulled from within conduit 66 in order to secure the receptacle 76 to baseboard 58 or to chair rail 62. FIG. 2 shows joints 64 and 68 in baseboards 58 and in chair rails 62, respectively, where two sections of baseboards 58 and two sections of chair rails 62 are joined to continue the baseboard 58 and chair rail 62, respectively.

The incorporation of conduits 66, 70 with magnetic electrical connectors 74, 78, into trim work makes them readily accessible from inside the room. Conduits 66, 70 are easily added and replaced compared to finding, tracing and accessing wiring inside walls. Accordingly, installation, modification, renovation, and improvement of the electrical system in pre-existing buildings, such as offices, apartments, commercial establishments, is simplified and its costs significantly reduced. Existing trim pieces may be replaced with those made according to the present disclosure to add a receptacle 76 and a universal serial bus port 46, as seen in FIG. 1, and to expand or improve wireless capabilities for users.

The presently disclosed conduit 66, 70 may also improve security by providing power to cameras attached to access points in, for example, crown molding or window frames. Window frames can also carry security sensors with wiring that connects to interior window trim and follows conduit 66, 70 in a baseboard 58, for example, to control panels or monitors (not shown) for viewing activities outside the window or for sensing the condition of the window itself, namely, whether open or closed, locked or unlocked.

Figure 3:
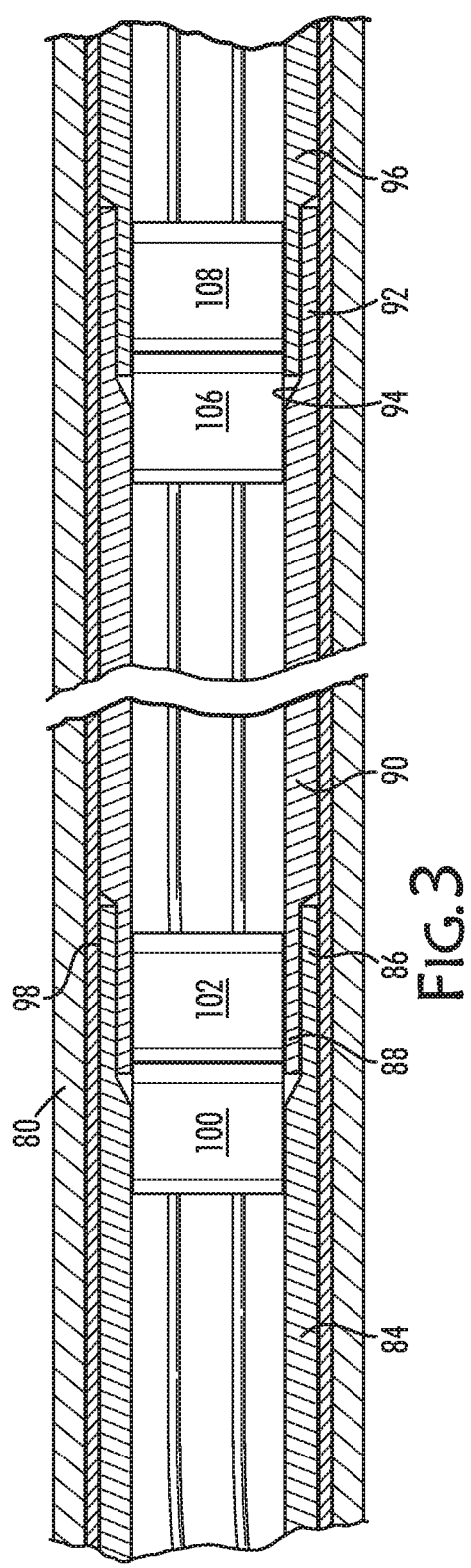
FIG. 3 is a partial cross-sectional view of portions of three connected conduits with magnetic electrical connectors for delivering electricity according to an aspect of the disclosure.
Figure 4:
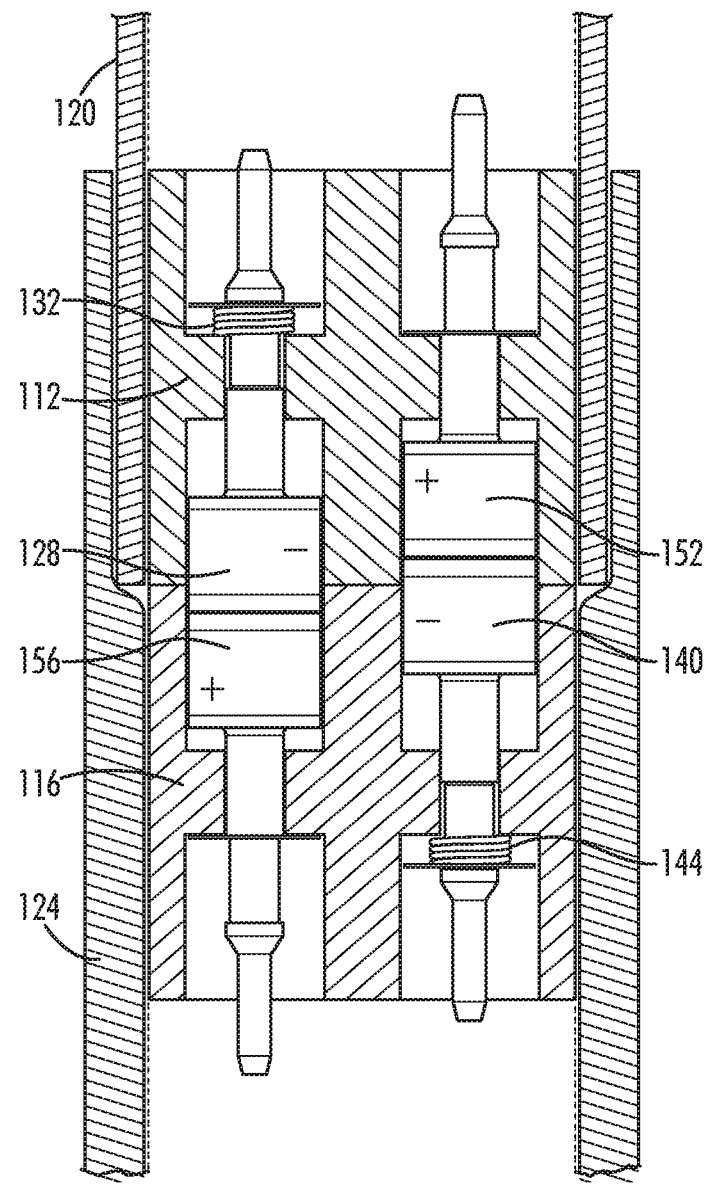
FIG. 4 is a cross-sectional view of the magnetic electrical connectors of FIG. 3, according to an aspect of the disclosure.

FIGS. 3 and 4 show a group of conduits 84, 90, 96 inside a support 80. First conduit 84 has a second end 86 (its first end is not visible in FIGS. 3 and 4) that is formed to receive a first end 88 of second conduit 90, which first end 88 of second conduit 90 may be identical to the first end (not shown) of first conduit 84. Second conduit 90 has a second end 92 formed to receive a first end 94 of a third conduit 96. Second end 86 and second end 92 may be reduced in diameter, as shown, from that of the balance of first conduit 84 and first end 88 of second conduit 90, respectively. First end 94 of third conduit 90 may also be reduced in diameter so that first end 88 of second conduit 90 can be received inside of second end 86 of first conduit 84, and first end 94 of third conduit 96 can be received in second end 92 of second conduit 90. First conduit 84, second conduit 90, and third conduit 96 nest securely together so that they can be connected by simply pushing them together.

Support 80 may be made of wood or of solid or foamed plastic with a channel similar to channel 22, which support 80 is drilled, routed, or extruded therein for receiving first conduit 84, second conduit 90 and third conduit 96. A liner 98, as shown in FIGS. 3 and 4 may be included to facilitate insertion of first, second and third conduits 84, 90 and 96, respectively. Support 80 may be made of foamed polyvinyl chloride extruded around or over a liner 98. Liner 98 may be made of metal or solid polyvinyl chloride.

Inside first, second and third conduits 84, 90 and 96, respectively, are magnetic electrical connectors 100, 102, 106 and 108. Magnetic electrical connectors 100 and 102 connect with as a pair, and magnetic electrical connectors 106 and 108 connect as a pair. Both pair of magnetic electrical connectors 100, 102, and 106 and 108, connect magnetically, self-orienting by magnetic repulsion, so that contact is established and electrical polarity is preserved.

FIG. 4 illustrates the connection between two magnetic electrical connectors 112 and 114. Magnetic electrical connector 112 is held in the end of conduit 120; magnetic electrical connector 116 is held near the end of conduit 124, and recessed within conduit 124 so it seats within conduit 124 where the diameter of conduit 124 is not reduced and magnetic electric connector 116 is therefore able to receive conduit 120 and magnetic electrical connector 112. The two conduits 120, 124 may therefore be frictionally joined to bring magnetic electrical connectors 112 and 116 into contact.

When magnetic electrical connectors 112, 116, are brought close, they orient themselves by magnetic repulsion, twisting so that terminals with opposite polarities are joined. A negative terminal 128 in magnetic electrical connector 112 is pulled against a spring 132 by a distance above the top surface 136 of magnetic electrical connector 112 by magnetic attraction to contact a positive terminal 152 in magnetic electrical connector 116. Likewise, a negative terminal 140 of magnetic electrical connector 116 is pulled against a spring 144 above a top surface 138 of magnetic electrical connector 116 by magnetic attraction toward a positive terminal 156 in magnetic electrical connector 112. Negative terminal 128 of magnetic electrical connector 112 moves into contact with positive terminal 152, which is held in fixed position in magnetic electrical connector 116, just as negative terminal 140 moves to contact a positive terminal 156, which is held in fixed position in magnetic electrical connector 112. Electrical connection thus occurs between magnetic electrical connector 112 and magnetic electrical connector 116. In addition, magnetic electrical connector 112 and magnetic electrical connector 116 interlock against lateral forces because negative terminals 128 and 140 are partially inserted into conduits 124 and 120, respectively, wherein they hold magnetic electrical connectors 116 and 112, respectively.

Figure 5:
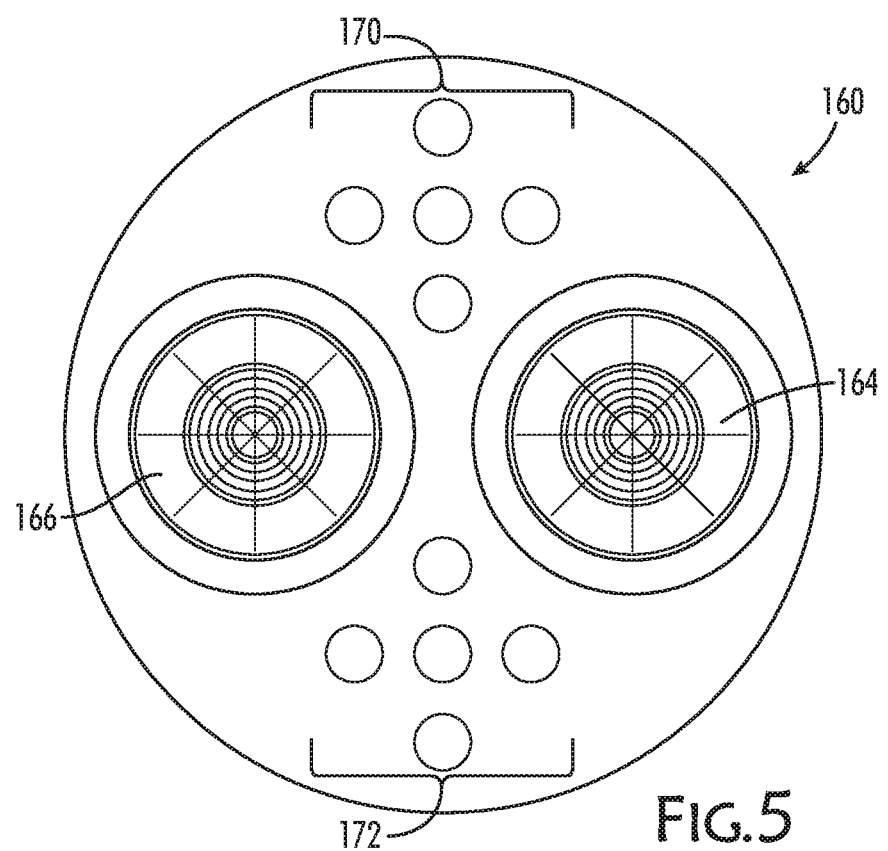
FIG. 5 is an end view of a magnetic electrical connector showing two terminals and several electrical pin contacts for use in transmitting electrical current as direct current, alternating current or digital pulses, according to an aspect of the disclosure.

FIG. 5 illustrates an end view of a magnetic electrical connector 160. In addition to a negative terminal 164 and a positive terminal 166, additional terminals may be present. For example, there may be two groups, 170 and 172, of four conductive pins that are capable of transmitting digital data pulses in either direction. Other numbers of groups and numbers (and arrangements) of pins in the group are possible depending on the requirements that dictate the selection of those numbers.

Figure 6:
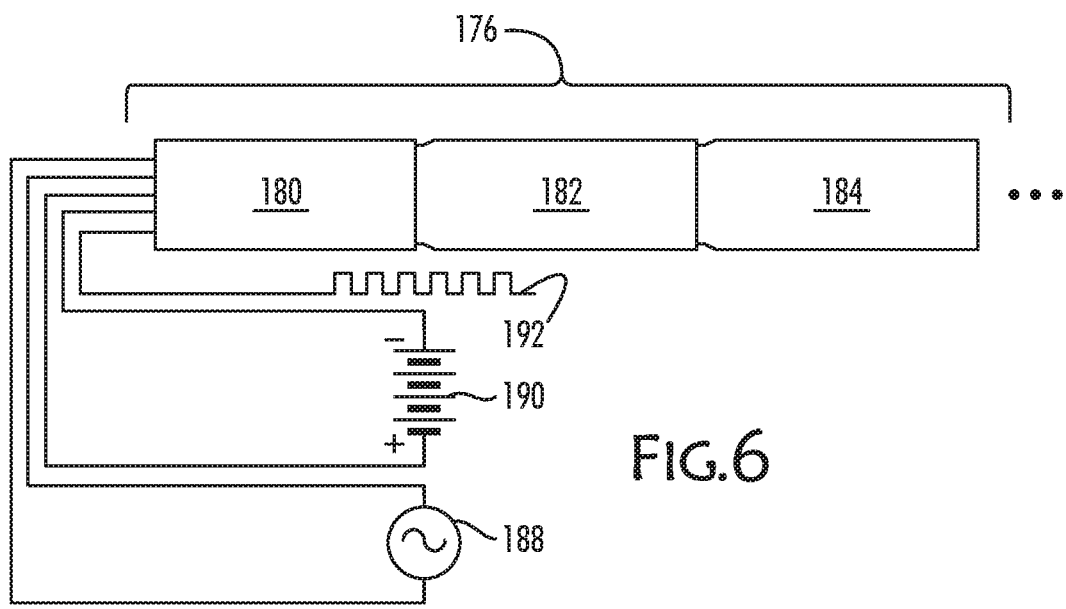
FIG. 6 is a diagram of the electrical outputs of plural conduits arranged in sequence in the present electrical access system, according to an aspect of the disclosure.

FIG. 6 summarizes in diagrammatic form the electrical current that can be carried by the present conduit or, as shown in FIG. 6, a series 176 of conduits 180, 182, 184. These forms of electrical current include alternating current 188 for household appliances, lighting, computers, televisions, for example; direct current 190 for charging tablet computers and mobile devices; and digital data 192.

Figure 7:
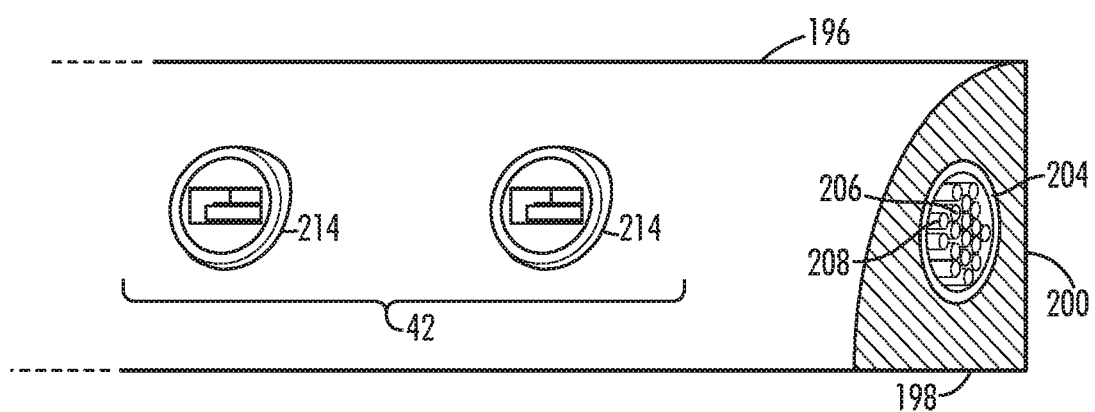
FIG. 7 is an exterior, partial cross-sectional view of quarter-round trim molding with a conduit inside from which, for example, an LED light may be powered and a universal serial bus port may provide recharging capability for mobile devices, according to an aspect of the disclosure.
Figure 8A:
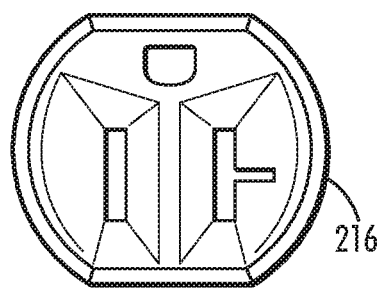
FIGS. 8A, 8B, and 8C illustrate examples of electrical loads, namely, an Edison socket as shown in FIG. 8A, a universal serial port as shown in FIG. 8B, and a wireless router antenna as shown in FIG. 8C, according to an aspect of the present disclosure.
Figure 8B:
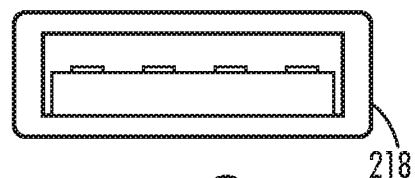
Figure 8C:
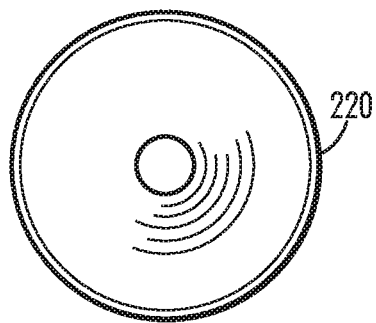

FIG. 7 shows quarter round molding 196, commonly used to hide seams between orthogonal surfaces, such as those between floor and wall and between the vertical ends of bookcases and walls. Quarter round molding 196 has two adjacent sides 198, 200 at right angles. Other supports may have one or more flat sides. Quarter round molding 196 includes a conduit 204 carrying electrical conductors 206, 208, which are made of a resilient, electrically conducting material such as copper or brass. Conductors 206, 208 can be diverted into contact with access points 42 along quarter round molding 196 (or other type), or into electrical contact with the type of access port 214 preferred by the user, including those shown in FIGS. 8A, 8B, and 8C. These figures show an Edison socket 216 with ground connection in FIG. 8A, a universal service bus port 218 in FIG. 8B, and a wireless antenna 220 in FIG. 8C.

Other devices can be attached to the ends of the wire pairs 206, 208 of a magnetic electrical connector, as shown in FIG. 7, for transmission of electric current or digital signals in either direction. These devices include, for example, lights, including accent lights, safety lighting, and nightlights; security cameras; inductance coils; batteries; sensors including motion sensors, heat sensors, and smoke detectors; and solar electric panels.

Magnetic electrical connectors self-align—a north end of a first magnet will respond naturally and automatically to a south end of a different magnet that is proximate to it—so correct installation is much more likely. The strength of the magnet field generated by a magnet determines the extent of the influence of its magnetic field. Objects affected by the magnetic field of a magnet may be said to be proximate to the magnet The conduits need only to be brought into alignment and the magnetic electrical connectors will then either not connect, based on magnetic forces such as repulsion, or connect, based on attraction, so the magnetic electrical connectors of like magnetic fields do not connect electrically and those of unlike magnetic fields connect electrically.

Figure 9:
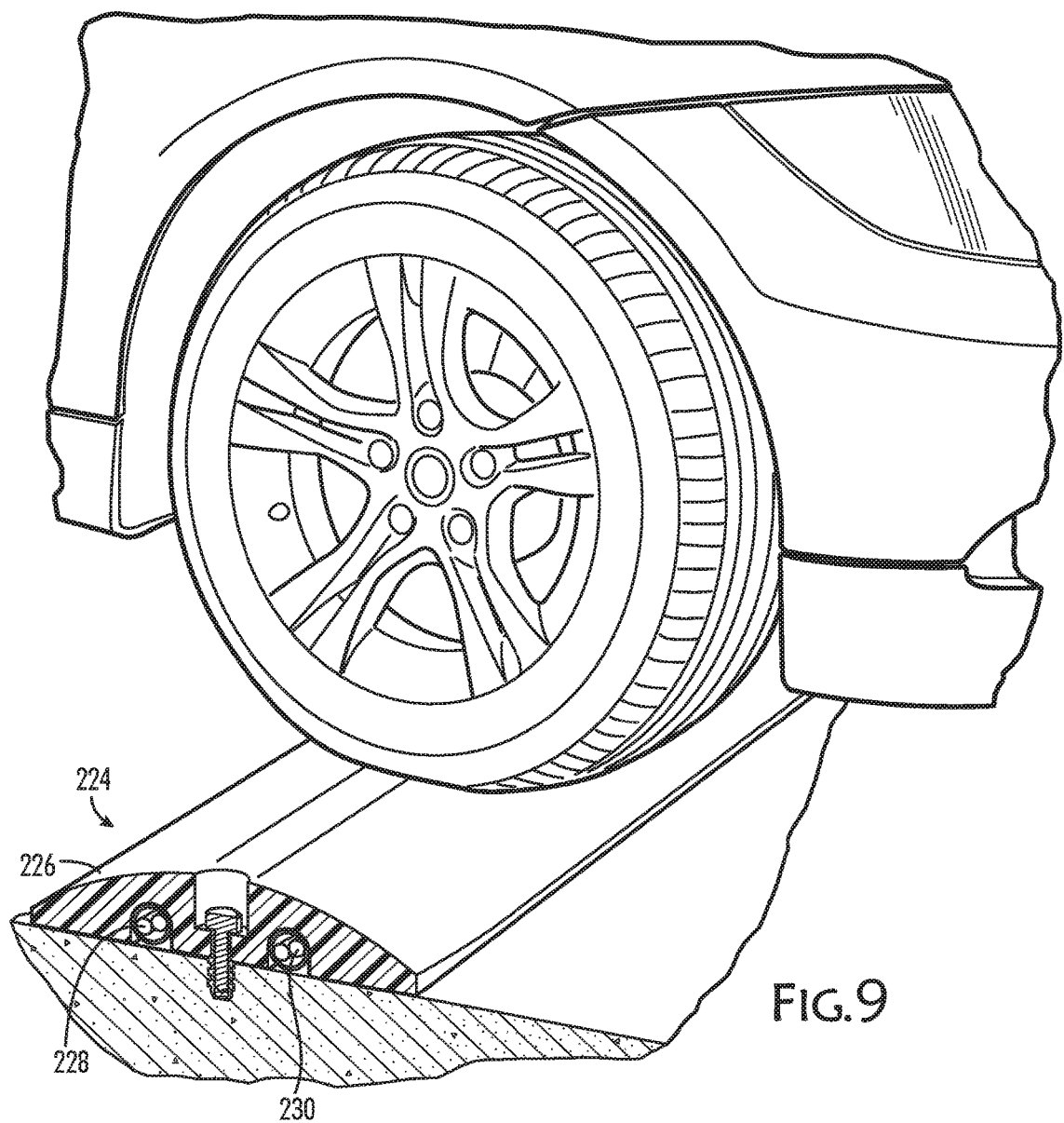
FIG. 9 illustrates a driver-over support on a supporting surface, which may be the ground, with the present conduits embedded in a groove in the support, according to an aspect of the present disclosure.

The present electrical access system is ideal for renovating older homes and buildings, for temporarily enhancing the electrical systems of existing buildings and for adding capabilities for temporary events such as outdoor events. Moreover, as seen in FIG. 9, a support 224 in outdoor applications can be a pair of "walk-over" or "drive-over" structural member 226, and having conduits 228, 230 embedded inside.

Figure 10:
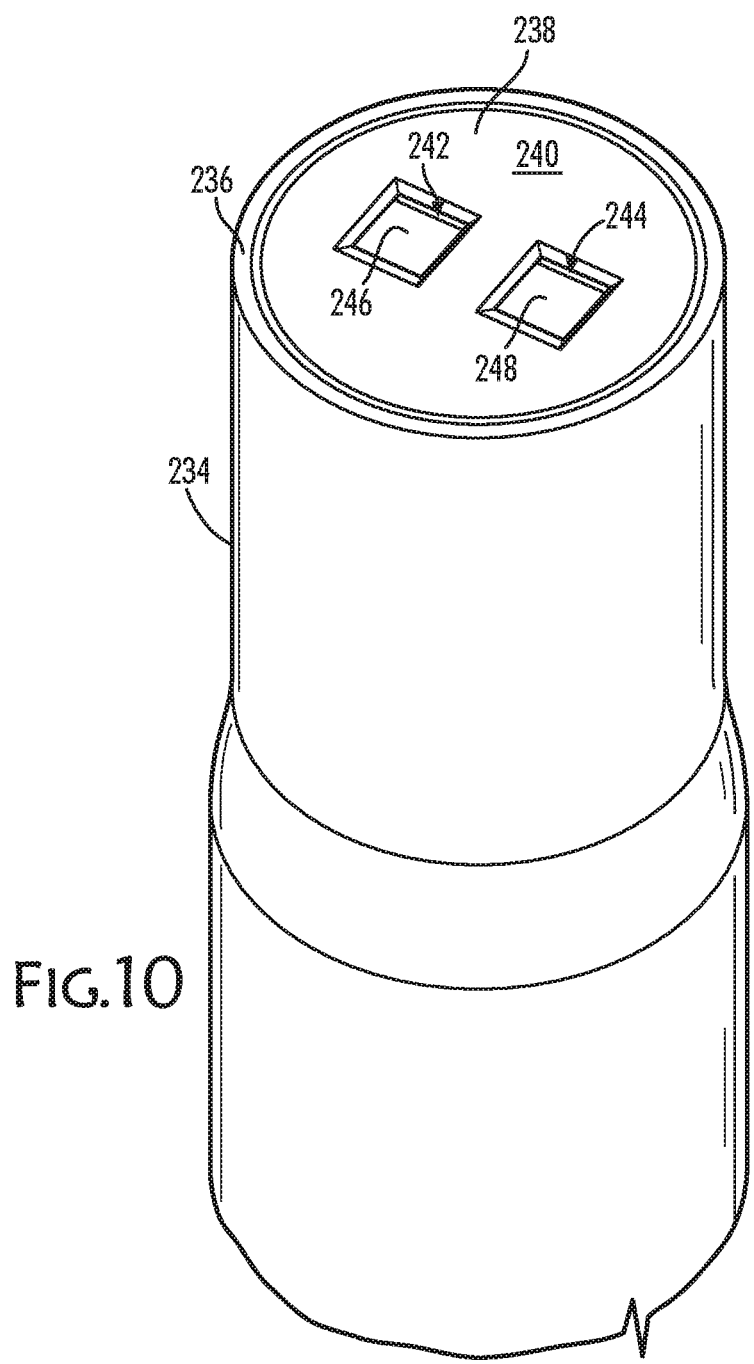
FIG. 10 is a perspective view of an aspect of a magnetic electrical connector flush-mounted in the end of a conduit, according to an aspect of the disclosure.

FIG. 10 shows a perspective view of a first conduit 234. First conduit 234 has a first end 236 that is reduced in diameter from the diameter of the balance of first conduit 234. A first magnetic electrical connector 238 is mounted in first end 236 of first conduit 234 so that a top surface 240 is flush with first end 236. A first aperture 242 and a second aperture 244 are formed in first magnetic electrical connector 238 where a portion of a first terminal 246 and a portion of a second terminal 248 can be seen.

Figure 11:
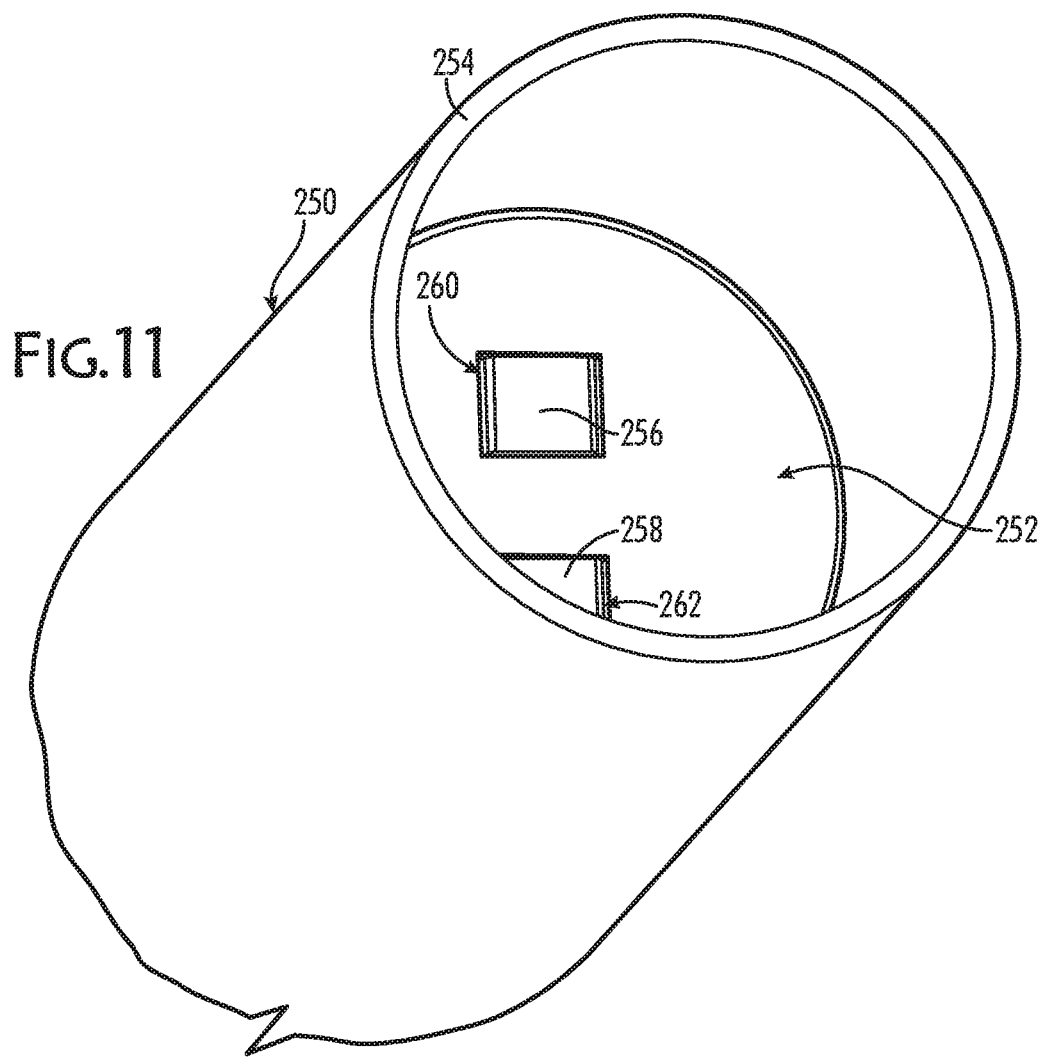
FIG. 11 is a perspective view of an aspect of another magnetic electrical connector, similar to that shown in FIG. 10 recessed in the end of a conduit, according to an aspect of the disclosure.

FIG. 11 shows a perspective view of a second conduit 250, which also has a first end 254. Unlike first conduit 234, wherein first end 236 has a reduced diameter, first end 254 of second conduit 250 has a diameter that is not reduced (or enlarged). First end 236 of first conduit 234 is dimensioned to be received inside first end 254 of second conduit 250.

A second magnetic electrical connector 252 is mounted inside of second conduit 250, recessed below first end 254. Second magnetic electrical connector 252 carries a third terminal 256 and a fourth terminal 258 seen through third aperture 260 and fourth aperture 262, respectively.

Figure 12:
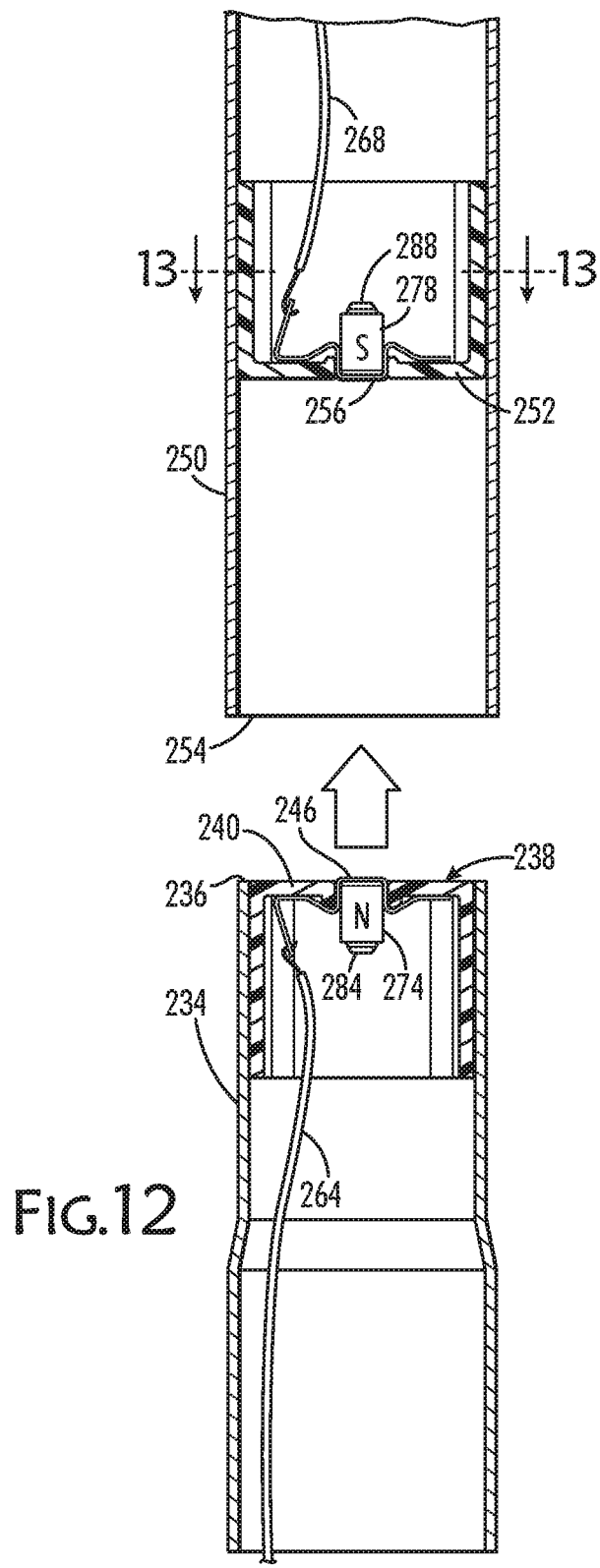
FIG. 12 is a side cross-sectional view of two magnetic electrical connectors, of the type shown in FIGS. 10 and 11, in conduits, the upper one recessed and the lower one flush-mounted, shown moving together, according to an aspect of the disclosure.

As illustrated in FIG. 12, which is a cross-sectional, side view of first conduit 234 and, above it, second conduit 250, which is inverted, as if about to be joined together. First magnetic electrical connector 238 is also rotated so that first terminal 246 is toward the viewer and hides second terminal 248 behind it. Second magnetic electrical connector 252 is also rotated so that third terminal 256 is toward the viewer and fourth terminal 258 is hidden behind it with respect to the viewer.

As first end 236 of first conduit 234 is inserted into first end 254 of second conduit 250, and first magnetic electrical connector 238 is brought into engagement with second magnetic electrical connector 252, first terminal 246 may be aligned with third terminal 256 and second terminal 248 may be aligned with fourth terminal 258. First end 236 of first conduit 234, with its reduced diameter, fits into first end 236 of second conduit 250, so as to enable the flush-mounted first magnetic electrical connector 238 to engage the recessed second magnetic electrical connector 252. An electrical connection is then obtained between a first wire 264 and first terminal 246 and a third terminal 256 and third wire 268. Not visible in FIG. 12 is another electrical connection between a second wire 266, a second aperture 244, a fourth terminal 258 and a fourth wire 270.

Additionally, a first magnet 274 and a third magnet 278 are visible in FIG. 12 and a second magnet 276 and a fourth magnet 280 are located behind first magnet 274 and third magnet so they are not visible in FIG. 12 and are obscured by first magnet 274 and third magnet 278.

Figure 13:
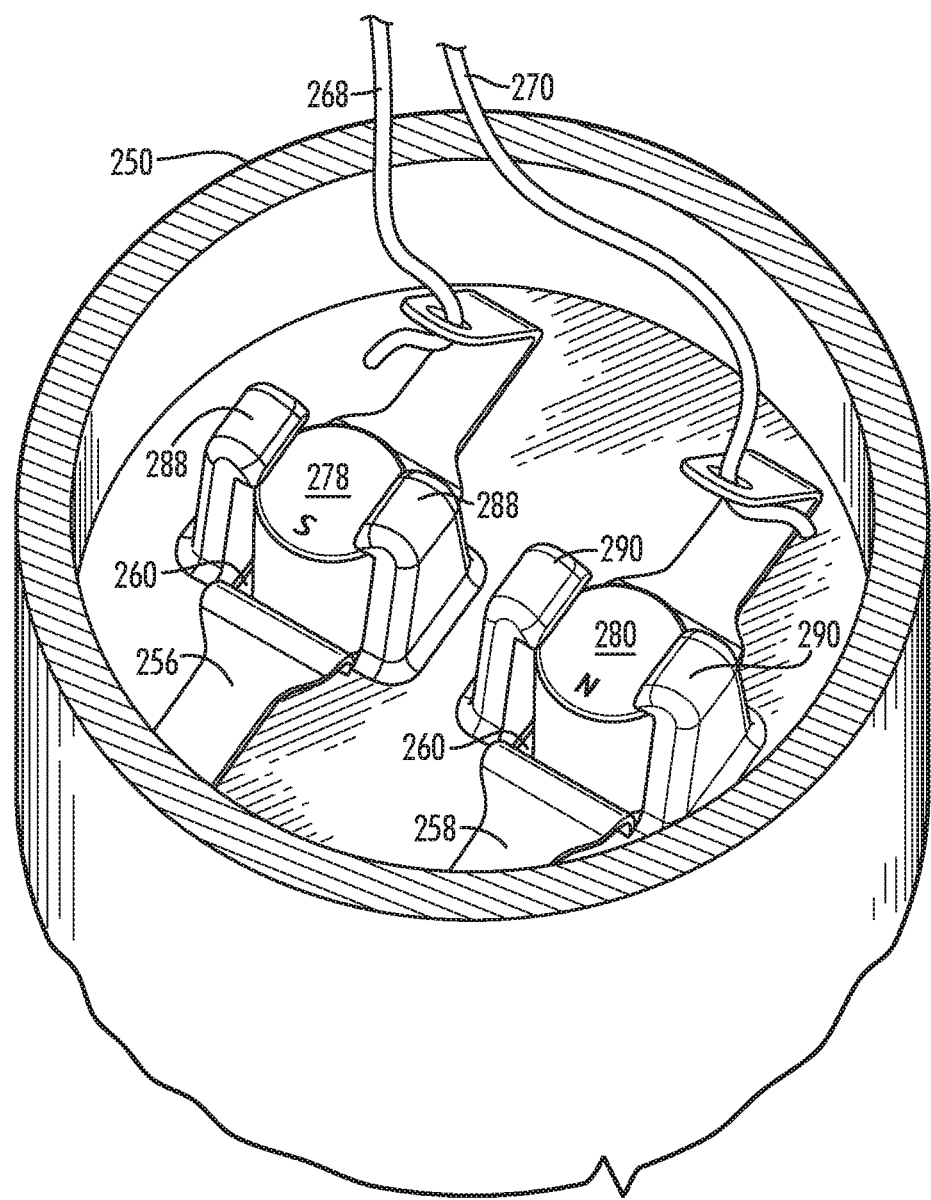
FIG. 13 is a perspective top view of the terminals of a magnetic electrical connector, according to an aspect of the disclosure.

FIG. 13 is a partial cross-sectional, perspective view of second magnetic electrical connector 272, which is at the top in FIG. 12. FIG. 13 shows conduit 250 and second magnetic electrical connector 252 in the same orientation as in FIG. 12 but in a top perspective view.

A third wire 268 and a fourth wire 270 are connect to third terminal 256 and fourth terminal 258, respectively, and run to first terminal 246 and to second terminal 248, respectively, and continue on to first wire 264 and second wire 266 (FIG. 15), respectively. Third terminal 256 runs under third magnet 278; fourth terminal 258 runs under a fourth magnet 280. Third terminal 256 is formed to seat in third aperture 260 so that it spans third aperture 260 and stays centered over third aperture 260; fourth terminal 258 is formed to seat in fourth aperture 262 in a similar manner as is first terminal 246 in first aperture 242 and second terminal 248 in second aperture 244. First terminal 246, second terminal 248, third terminal 256 and fourth terminal 258 may be made of a resilient conductor such as a copper or brass. First terminal 246, second terminal 248, third terminal 256 and fourth terminal 258 are bent and each has a small hole formed therein to facilitate connection to first wire 264, second wire 266, third wire 268 and fourth wire 270, respectively, and to hold first magnet 274, second magnet 276, third magnet 278 and fourth magnet 280 in first aperture 242, second aperture 244, third aperture 260 and fourth aperture 262.

Figure 14:
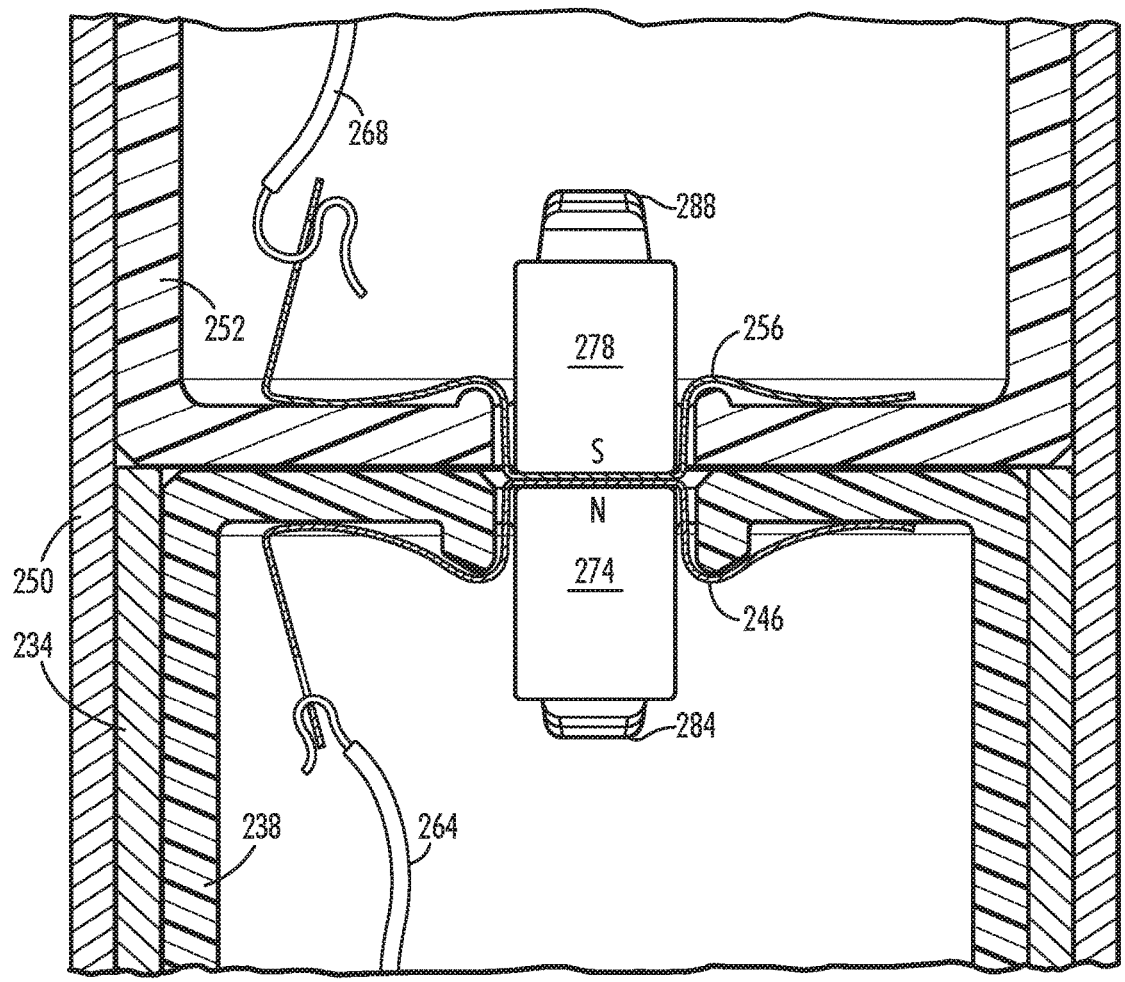
FIG. 14 is a partial view in cross section of conduits with magnetic electrical connectors in contact, according to an aspect of a disclosure.

As seen in FIG. 14, which shows first magnetic electrical connector 238 in engagement with second magnetic electrical connector 252. In FIG. 14, first magnet 274 and third magnet 278 are oriented so that the facing poles are magnetically attractive. Consequently, magnetic attraction forces between first magnet 274 and third magnet 278 force first terminal 246 and third terminal 256, which are between first magnet 274 and third magnet 278, into contact so that an electric current in first wire 264 can pass through first terminal 246, third terminal 256, and on to third wire 268. Similarly, in the orientation shown in FIG. 14, second magnet 276 and fourth magnet 280, which are obscured by first magnet 274 and third magnet 278, will also attract and push second terminal 248 and fourth terminal 258 together so electricity can flow from second wire 266 and fourth wire 270.

Figure 15:
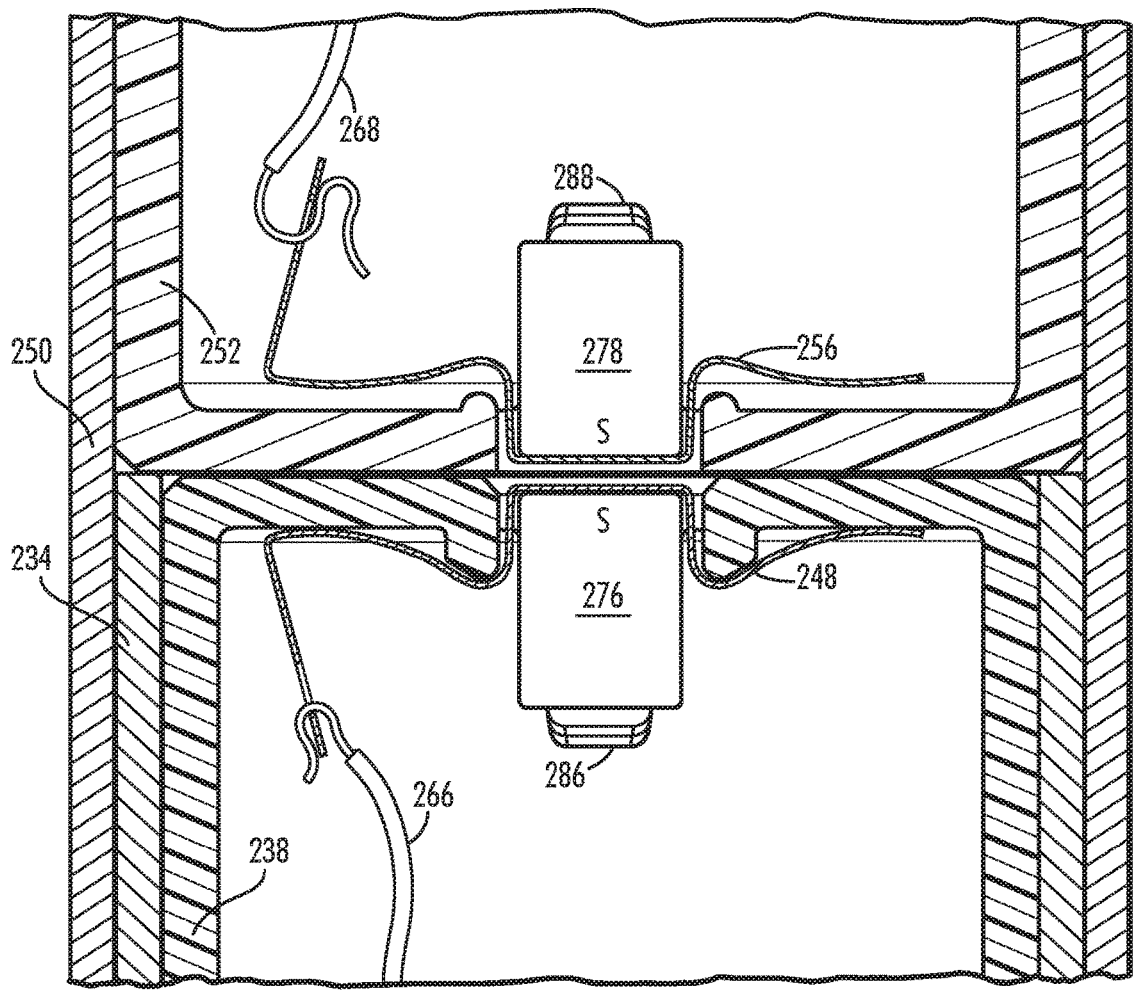
FIG. 15 is a partial view in cross section of conduits with magnetic electrical connectors not in contact but repelled by magnets FIG. 16A, 16B, 16C comprise a sequence of cross-sectional side views of a magnet being inserted between two opposing posts, wherein the opposing posts are flexible and resilient so that insertion of the magnet forces the posts apart until the magnet is fully inserted, upon which full insertion, the posts return to their original position and resist upward movement of the magnet, according to an aspect of the disclosure.

However, as seen in FIG. 15, if first magnetic electrical connector 238 and second magnetic electrical connector 252 are oriented as shown in FIG. 15, then first magnet 274 is opposite fourth magnet 280, and second magnet 276 is opposite third magnet 278. The orientation of first magnet 274 and fourth magnet 280 are such that they repel, as will second magnet 276 and third magnet 278. According, first terminal 246 and fourth terminal 258 will remain apart, and second terminal 248 and third terminal 256 will not be in contact, so electricity cannot flow from first wire 264 to fourth wire 270 and from second wire 266 to third wire 268.

Limiting movement of first magnet 274, second magnet 276, third magnet 278 and fourth magnet 280 when responding to magnetic repulsion (or gravity) are first posts 284, second posts 286, third posts 288, and fourth posts 290, shown in FIGS. 13, 14, and 15, with third posts 288 and fourth posts 290 best seen in detail in FIG. 13. Posts comprise pairs of posts, so first posts 284 comprise two posts; second posts 286 comprise two posts, etc. First magnet 274 is prevented from moving too far by first posts 284; second magnet 276 is prevented by second posts 286; third magnet 278 is prevented by third posts 288; and fourth magnet 280 is prevented from moving too far by fourth posts 290.

Figure 16A:
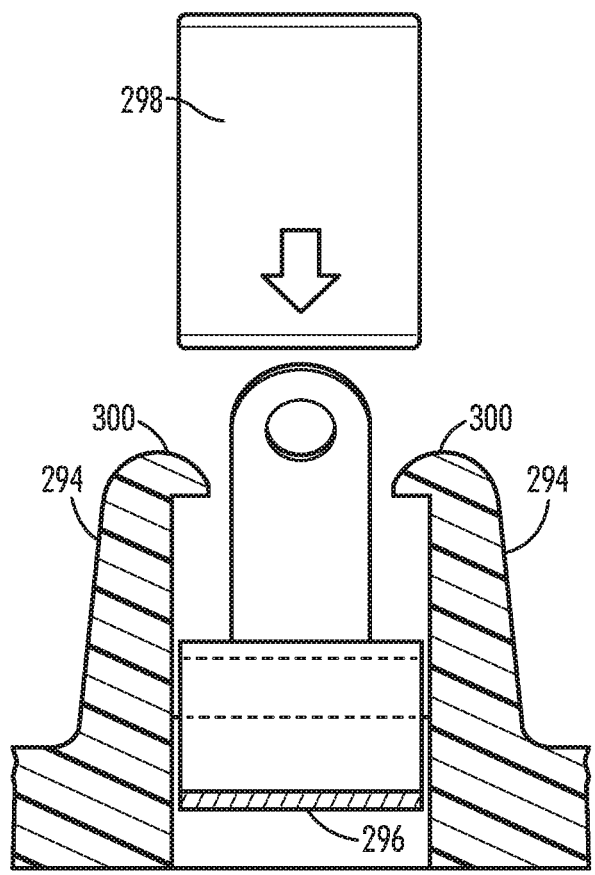
Figure 16B:
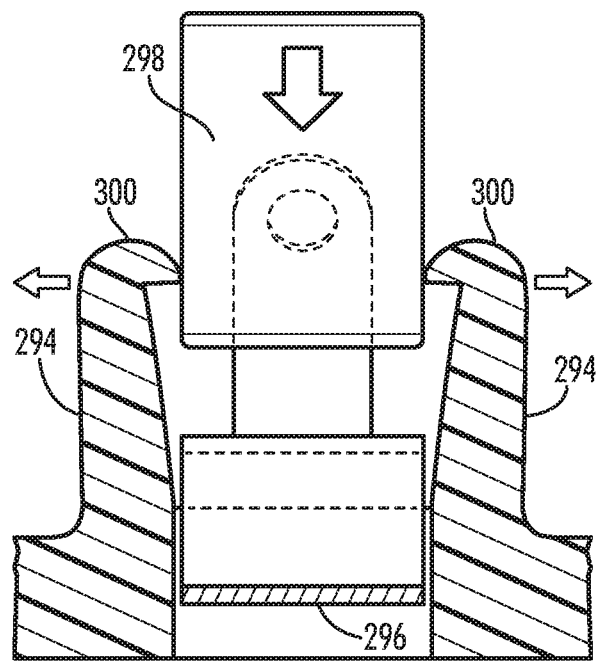
Figure 16C:
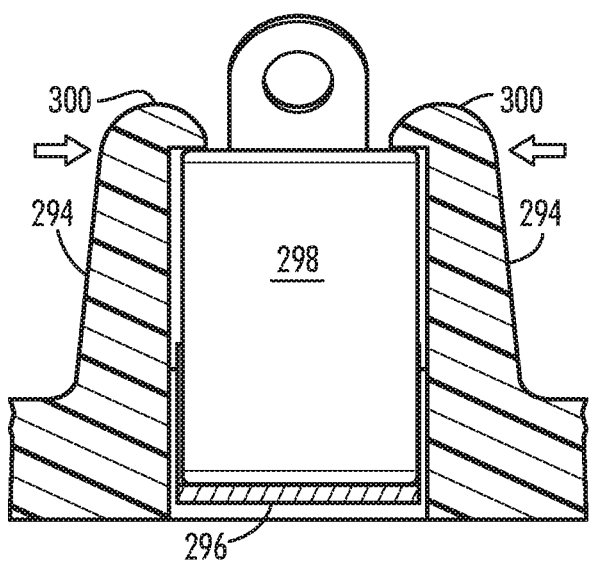

FIG. 16A shows posts 294 and a terminal 29. Posts 294 are made of a flexible, resilient material such as a plastic. FIG. 16B shows posts 294 with terminal 296 and with a magnet 298 partially inserted between posts 294. FIG. 16C shows posts 294 with terminal 296 and magnet 298 seated on terminal 296 and in place between posts 294. Curved portion 300 on posts 294, on the complete insertion of magnet 298, close over magnet 298 to prevent its removal.

Accordingly, magnets by their orientation and by the magnetic attraction and repulsion forces operate as switches to open or close circuits depending on the orientation of first and second magnetic electrical connectors by pushing terminals together or leaving them apart. They can therefore preserve polarity of direct current sources to the direct current loads.

Conduits, such as conduits shown herein may also carry internal controllers, power modifiers, and safety monitors, such as ground fault interrupters. These additional electrical devices may be installed in conduits described herein to meet general requirements based on safety regulations or specific needs. Accordingly, whenever new safety regulations are required, conforming to those requirements may be much easier with the present electricity access system.

Conduits may be made out of most any material that will work within the specified application and regulatory requirements. Conduits may be cylindrical and they otherwise are made to meet or exceed to applicable standards.

The present magnetic repulsion/attraction-based electrical access system connects automatically once workers bring the magnetic electrical connectors into proximity. It may reduce the cost of installing electrical, multiline phone systems, burglary systems, cable systems, paging systems, zonal sounds systems, cable antenna driver systems, local repeaters, intercom systems, instrument control systems, zonal air conditioning controllers and thermostats.

Because of their universal nature, general purpose conduits may be made in standard lengths (such as 6", 12", 18", 24", 30", 36", 48", 5', 10' sections) with short, dedicated inline taps for accessing AC power USB ports, networking connections, monitors, televisions, radios; night lights, counter lighting, under counter lighting, dedicated pole lights, etc.

Those skilled in the art of the installation and deployment of electrical devices and appliances in buildings, shelters, and homes will appreciate that many modifications and substitutions may be made in the foregoing description of aspects of the disclosure.

What is claimed is:

1. A device, comprising,
    a conduit having a first end and a second end;
    a magnetic electrical connector carried by said first end of said conduit, said magnetic electrical connector having a first aperture and a second aperture formed therein;
    a first terminal seated in said first aperture of said magnetic electrical connector;
    a second terminal seated in said second aperture of said magnetic electrical connector;
    a first magnet on said first terminal at said first aperture, said first magnet having a north end and a south end;
    a second magnet on said second terminal at said second aperture, said second magnet having a north end and a south end;
    at least one first post;
    at least one second post;
    a first wire attached to said first terminal; and
    a second wire attached to said second terminal, wherein said north end of said first magnet faces said first terminal, and wherein said south end of said second magnet faces said second terminal; and wherein said at least one first post holds said north end of said first magnet facing said first terminal and wherein said at least one second post holds said south end of said second magnet facing said second terminal.

2. The device of claim 1, wherein said conduit is in a support and wherein said support is decorative molding.

3. The device of claim 1, wherein said conduit is in a support and wherein said support has a primary function.

4. The device of claim 1, wherein said first terminal is made of a resilient electrically conducting material.

5. The device of claim 1, wherein said first terminal is narrower than said first aperture is wide and said first terminal is operable to extend through said first aperture.

6. The device of claim 1, wherein said first terminal is formed to seat in said first aperture.

7. The device of claim 1, wherein said at least one first post is a first pair of first posts holding said first magnet proximate to said first terminal and said at least one second post is a second pair of second posts holding said second magnet proximate to said second terminal.

8. The device of claim 1 wherein said at least one first post has a curved portion.

9. The device of claim 1, wherein said at least one first post is made of a resilient material.

10. A device, comprising:
a magnetic electrical connector having an aperture;
a terminal carried by said magnetic electrical connector, said terminal operable to conduct an electric current, and wherein said terminal is made of a resilient electrical conductor; and
a magnet carried by said magnetic electrical connector and held by said magnetic electrical connector proximate to said terminal, said magnet being operable to bend said terminal toward and through said aperture.

11. The device of claim 10, further comprising a conduit and wherein said magnetic electrical connector is in said conduit.

12. The device of claim 10, wherein said connector includes a post operable to hold said magnet proximate to said terminal.

* * * * *